US009490942B2

(12) United States Patent
Park

(10) Patent No.: US 9,490,942 B2
(45) Date of Patent: Nov. 8, 2016

(54) METHOD AND TERMINAL FOR TRANSMITTING AND RECEIVING PHYSICAL UPLINK DATA CHANNEL MAPPING INFORMATION

(71) Applicant: KT CORPORATION, Gyeonggi-do (KR)

(72) Inventor: Kyu Jin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 55 days.

(21) Appl. No.: 14/407,984

(22) PCT Filed: May 13, 2013

(86) PCT No.: PCT/KR2013/004233
§ 371 (c)(1),
(2) Date: Apr. 22, 2015

(87) PCT Pub. No.: WO2014/003313
PCT Pub. Date: Jan. 3, 2014

(65) Prior Publication Data
US 2015/0296533 A1    Oct. 15, 2015

(30) Foreign Application Priority Data

Jun. 25, 2012  (KR) .................. 10-2012-0068206
Dec. 13, 2012  (KR) .................. 10-2012-0145631

(51) Int. Cl.
*H04J 3/16*     (2006.01)
*H04L 1/18*     (2006.01)
*H04B 7/208*    (2006.01)
*H04L 5/00*     (2006.01)

(52) U.S. Cl.
CPC ............. *H04L 1/1893* (2013.01); *H04B 7/208* (2013.01); *H04L 5/0051* (2013.01)

(58) Field of Classification Search
CPC ............. H04W 72/1268; H04B 7/208; H04L 5/0051; H04L 1/1893
USPC .................................. 370/310–350, 431–463
See application file for complete search history.

(56) References Cited

U.S. PATENT DOCUMENTS

| | | | |
|---|---|---|---|
| 9,258,832 B2* | 2/2016 | Noh .................. | H04W 74/0833 |
| 2011/0194412 A1 | 8/2011 | Park et al. | |
| 2011/0194523 A1 | 8/2011 | Chung et al. | |
| 2011/0211522 A1 | 9/2011 | Chung et al. | |
| 2011/0244873 A1 | 10/2011 | Lee et al. | |
| 2011/0317610 A1 | 12/2011 | Park et al. | |
| 2012/0033588 A1 | 2/2012 | Chung et al. | |
| 2012/0044870 A1* | 2/2012 | Mochizuki ............. | H04B 7/024 370/328 |
| 2012/0063386 A1 | 3/2012 | Park et al. | |
| 2012/0140726 A1 | 6/2012 | Moon et al. | |

(Continued)

FOREIGN PATENT DOCUMENTS

| | | |
|---|---|---|
| KR | 10-2008-0085653 A | 9/2008 |
| KR | 10-2011-0021603 A | 3/2011 |

(Continued)

*Primary Examiner* — Ricky Ngo
*Assistant Examiner* — Wei-Po Kao
(74) *Attorney, Agent, or Firm* — IP Legal Services, LLC

(57) ABSTRACT

The present disclosure relates to a wireless communication system. The wireless communication system includes a transmission and reception point and a terminal. The transmission and reception point and the terminal perform cooperative communication.

14 Claims, 8 Drawing Sheets

(56) References Cited

U.S. PATENT DOCUMENTS

| | | | |
|---|---|---|---|
| 2012/0147845 A1* | 6/2012 | Park | H04L 5/0035 370/330 |
| 2012/0236816 A1* | 9/2012 | Park | H04W 74/08 370/329 |
| 2013/0094384 A1 | 4/2013 | Park et al. | |
| 2013/0210422 A1* | 8/2013 | Pani | H04W 8/02 455/423 |

FOREIGN PATENT DOCUMENTS

| | | |
|---|---|---|
| KR | 10-2011-0061507 A | 6/2011 |
| KR | 10-2011-0074747 A | 7/2011 |
| WO | 2011/145886 A2 | 11/2011 |

* cited by examiner

| FIELD | BIT |
|---|---|
| INDICATOR WHICH DISTINGUISHES DCI FORMATS 0 AND 1A | 1 |
| HOPPING(HOPPING) DISPLAY | 1 |
| MODULATING AND ENCODING SCHEME INCLUDING REDUNDANCY VERSION | 5 |
| NEW DATA INDICATOR | 1 |
| UPLINK INDICATOR | 2 |
| PHASE ROTATION OF DM-RS | 3 |
| CQI REQUEST | 1 |
| SRS RESOURCE MAPPING | 1 |

METHOD AND TERMINAL FOR TRANSMITTING AND RECEIVING PHYSICAL UPLINK DATA CHANNEL MAPPING INFORMATION

CROSS REFERENCE TO RELATED APPLICATIONS

This application is a National Stage Patent Application of PCT International Patent Application No. PCT/KR2013/004233 (filed on May 13, 2013) under 35 U.S.C. §371, which claims priority to Korean Patent Application Nos. 10-2012-0068206 (filed on Jun. 25, 2012) and 10- 2012-0145631(filed on Dec. 13, 2012), the teachings of which are incorporated herein in their entireties by reference.

TECHNICAL FIELD

The present disclosure relates to a wireless communication system in which a transmission/reception point and a terminal perform coordinated communication.

BACKGROUND ART

The multi antenna-based wireless communication system uses technologies such as the closed-loop precoding transmission scheme, the Adaptive Modulation and Coding (AMC) scheme, the channel-sensitive scheduling scheme, etc.

Using the closed-loop precoding transmission scheme, a gain of a reception signal may be improved by controlling phases of multi antenna channels. Using the AMC scheme, a transmitter can adjust an amount of transmitted data according to a channel state. Using the channel-sensitive scheduling-based resource management method, the transmitter can selectively provide a service to a user having a good channel state among several users, thus increasing the system capacity as compared with a method of allocating a channel to a user and servicing the user through the allocated channel.

For example, the closed-loop precoding transmission scheme, the AMC scheme, and the channel-sensitive scheduling scheme receive channel information from a receiver and apply proper precoding, modulation, and encoding at the most efficient time point.

In a wireless communication system using the Orthogonal Frequency Division Multiple Access (OFDMA) scheme, one of various reasons for increasing the capacity in the OFDMA scheme is ability to perform the scheduling on an axis of the frequency. Although a capacity gain is acquired according to the time-varying channel characteristic using the channel-sensitive scheduling scheme, it is possible to obtain a higher capacity gain with use of the frequency-varying channel characteristic.

The closed-loop precoding transmission scheme, the AMC scheme, and the channel-sensitive scheduling scheme can improve transmission efficiency if the transmitter acquires sufficient information on a transmission channel. When the transmitter cannot estimate a state of the transmission channel from a reception channel as in the Frequency Division Duplex (FDD) scheme, a receiver reports information on the transmission channel to the transmitter. However, in a wireless communication system environment, a channel state varies over time. Thus, when the report on the channel state is delayed, the efficiencies of the closed-loop precoding transmission scheme, the AMC scheme, and the channel-sensitive scheduling scheme may deteriorate.

In the wireless communication system, one base station (e.g., eNB) is in charge of users within a predetermined coverage area, and when the users move outside of the coverage area, the users are handed over to another base station (e.g., eNB) for maintaining a call.

In the wireless communication system, since a user suffers interference from a signal transmitted from another base station, the channel state of the user is relatively poor. Thus, a user who is located closer to the base station can receive a service with a higher transmission rate, and a user who is located at the boundary of a cell coverage area receives a service with a lower transmission rate. In order to solve the above-mentioned problem, cooperative transmission is expected to be introduced in the $4^{th}$ generation mobile communication system. The cooperative transmission is a technology for transmitting a signal for a user located at a boundary of a cell.

DETAILED DESCRIPTION OF THE INVENTION

In this background, an aspect of the present disclosure is to provide a method of transmitting/receiving physical uplink data channel mapping information in a wireless communication system and a terminal using the same.

In order to implement the aforementioned aspect, in accordance with an aspect of the present disclosure, a method of transmitting channel mapping information by a transmission/reception point is provided. The method may include: generating physical uplink data channel mapping information of a transmission/reception point different from a serving transmission/reception point of a first user equipment (UE), wherein the first UE belongs to the serving transmission/reception point; and transmitting the physical uplink data channel mapping information to the first UE.

In accordance with another aspect of the present disclosure, a method of transmitting an uplink data channel by a user equipment (UE) is provided. The method may include: receiving physical uplink data channel mapping information of a target transmission/reception point from a serving transmission/reception point of the UE, wherein the target transmission/reception point is different from the serving transmission/reception point and the UE belongs to the serving transmission/reception point; mapping a physical uplink data channel to a wireless resource according to the physical uplink data channel mapping information; and transmitting the physical uplink data channel mapped to the wireless resource to the target transmission/reception point.

In accordance with yet another aspect of the present disclosure, a user equipment (UE) for transmitting an uplink data channel is provided. The UE may include: a reception unit configured to receive physical uplink data channel mapping information of a target transmission/reception point from a serving transmission/reception point of the UE, wherein the target transmission/reception point is different from the serving transmission/reception point and the UE belongs to the serving transmission/reception point; a controller configured to map a physical uplink data channel to a wireless resource according to the physical uplink data channel mapping information; and a transmission unit configured to transmit the physical uplink data channel mapped to the wireless resource to the target transmission/reception point.

A method of providing physical uplink data channel mapping information in a wireless communication system, a transmission/reception point using the same, a method of transmitting a physical uplink data channel, and a terminal using the same according to an embodiment of the present disclosure can perform cooperative communication.

MODE FOR CARRYING OUT THE INVENTION

Figure 1:
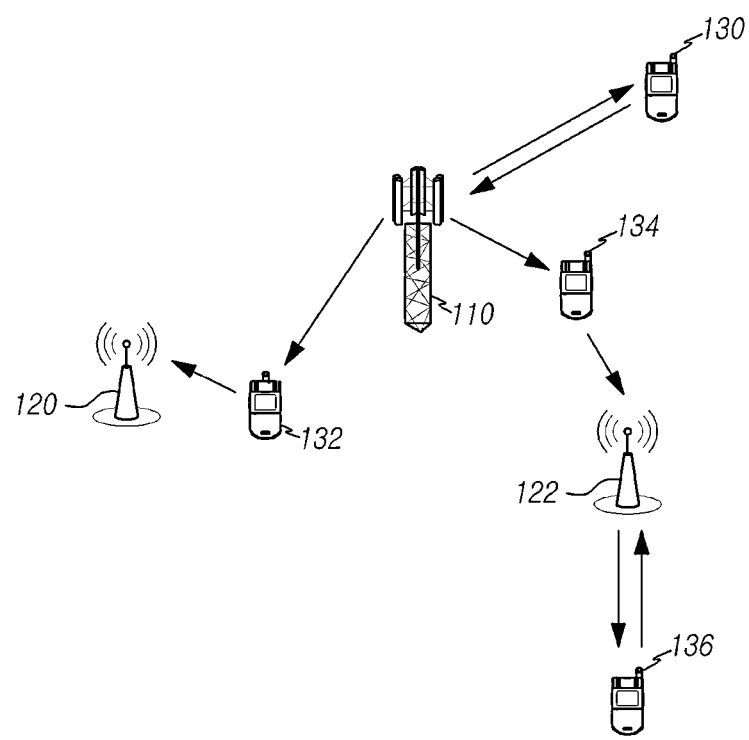
FIG. 1 illustrates a wireless communication system for performing cooperative communication.

Hereinafter, exemplary embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

FIG. 1 illustrates a wireless communication system for performing cooperative communication.

Referring to FIG. 1, a wireless communication system 100 provides various communication services such as a voice service, a packet service, a data service, etc.

The wireless communication system 100 may include transmission/reception points 110, 120, and 122. Each transmission/reception point can provide a communication service to a specific geographical area or a specific frequency area and may be referred to as a "site".

User Equipments (UEs) 130, 132, 134, and 136 may be stationary or mobile, and may be called other terms such as a Mobile Terminal (MT), a User Terminal (UT), a Subscriber Station (SS), a wireless device, a Personal Digital Assistant (PDA), a wireless modem, a handheld device, etc.

The transmission/reception points 110, 120, and 122 generally refer to stations which communicate with terminals 130, 132, 134, and 135, and may be defined as one of a component carrier wave or a cell, evolved-NodeB (eNodeB), a Base Transceiver System (BTS), an access point, a Femto eNodeB, a Home eNodeB (HeNodeB), a relay, a Pico eNodeB, a Remote Radio Head (RRH), a hot spot, and a Remote Unit (RU). Otherwise, the transmission/reception points 110, 120, and 122 may be defined as a set of antenna ports. Further, the transmission/reception points 110, 120, and 122 can transmit information on a set of antenna ports thereof to the UEs by Radio Resource Control (RRC) signaling. Thus, a plurality of transmission/reception points in one cell can be defined as a set of antenna ports. An intersection between sets of antenna ports is always a null set.

A cell is interpreted as comprehensive meaning indicating some areas covered by the transmission/reception points 110, 120, and 122, and has meaning including all of various coverage areas such as a mega cell, a macro cell, a pico cell, a Femto cell, etc. The transmission/reception points 110, 120, and 122 may imply a transmission point for transmitting a signal in order to provide a communication service and imply a reception point for receiving a signal from the UEs 130, 132, 134, and 136 in order to provide a communication service.

In the specifications, the transmission/reception points and the UE are used as comprehensive meanings indicating two transceiving subjects used for implementing the technology and the technical spirit described in the specifications, and are not limited to a specifically term or word.

Hereinafter, downlink implies communication or a communication path from a transmission/reception point to a UE, and uplink implies communication or a communication path from a UE to a transmission/reception point.

A wireless communication system may adapt various multiple access schemes, such as the Code Division Multiple Access (CDMA), the Time Division Multiple Access (TDMA), the Frequency Division Multiple Access (FDMA), the Orthogonal Frequency Division Multiple Access (OFDMA), the Single Carrier-FDMA (SC-FDMA), the OFDM-FDMA, the OFDM-TDMA, and the OFDM-CDMA. These modulation schemes demodulate signals received from users of a communication system so as to increase the capacity of the communication system. For uplink transmission and downlink transmission, a wireless communication system may use the Time Division Duplex (TDD) scheme which performs transmission using different times or the Frequency Division Duplex (FDD) scheme which performs transmission using different frequencies.

An embodiment of the present specification may be applied for resource allocation in asynchronous wireless communication advanced to Long Term Evolution (LTE) and LTE-advanced via global systems for mobile communication (GSM), wideband code division multiple access (WCDMA), high speed packet access (HSPA) and in synchronous wireless communication advanced to code division multiple access (CDMA), CDMA-2000, and ultra-mobile broadband (UMB). However, the embodiments of the present disclosure are not limited thereto. The embodiments of the present disclosure may be applied to other related technical fields as well.

In accordance with at least one embodiment, a wireless communication system may be a Coordinated Multi-Point (CoMP) transmission/reception system, a coordinated multi-antenna transmission system, or a coordinated multi-cell communication system.

The CoMP system refers to a communication system for supporting CoMP, or a communication system adopting CoMP. The CoMP is a technology for controlling and combining signals transmitted from or received by multiple transmission/reception points. The CoMP can increase data throughput and provide high quality.

In the CoMP system, the transmission/reception points 110, 120, and 122 can provide a service by allocating the same frequency resource to the same time period when attempting to provide coordinated transmission and reception to one terminal 134. That is, transmission/reception points are selected as coordinated transmission/reception points in the same time period and the coordinated transmission/reception point can transmit/receive data to/from one UE using the same frequency resource.

Each transmission/reception point or cells can configure multi transmission/reception points. For example, the multi transmission/reception points may be a macro cell for forming a homogeneous network. Further, the multi transmission/reception points may be RRHs having a macro cell and high transmission power. Further, the multi transmission/reception points may be RRHs having a macro cell and low transmission power in an area of the macro cell.

The CoMP system can selectively apply CoMP. In a CoMP mode, the CoMP system performs communication using CoMP. In other modes, such as a normal mode or a non-CoMP mode, the CoMP system performs communication without CoMP.

For example, the UEs 132 and 134 among the UEs 130, 132, 134, and 136 may be a CoMP terminal. The CoMP terminals 132 and 134 are components constituting the CoMP system. The CoMP terminals 132 and 134 can perform communication with a CoMP cooperating set or a CoMP set. The CoMP terminals 132 and 134 can operate in the CoMP mode or in the normal mode, similar to the CoMP system. Further, the CoMP set is a set of transmission/reception points which directly or indirectly participate in data transmission in a specific time-frequency resource for the CoMP terminal. Further, the CoMP terminals 132 and 134 may use a Single User Multi Input Multi Output (SU-MIMO) scheme as well as a Multi User Multi Input Multi Output (MU-MIMO) scheme. Although the UE receives data separately from the transmission/reception points, the UE may recognize such separated data reception from multiple transmission/reception points as data reception from one transmission point because the UE uses the same frequency band to receive the data separately transmitted from the multiple transmission/reception points.

Direct participation in data transmission or data reception means that transmission/reception points actually transmit data to the CoMP terminal or receive data from the CoMP terminal in the corresponding time-frequency resource. Indirect participation in data transmission or data reception means that transmission/reception points do not actually transmit data to the CoMP terminal or receive data from the CoMP terminal in the corresponding time-frequency resource, but contribute in determination of user scheduling/beamforming.

The CoMP terminals 132 and 134 may receive a signal from a CoMP set at the same time, and may transmit a signal to the CoMP set at the same time. At this time, the CoMP system minimizes interference influence between CoMP sets by considering a channel environment of each of cells constituting the CoMP set.

The CoMP system may be operated in various scenarios. A first CoMP scenario may refer to an intra-site CoMP. In the intra-site CoMP, a plurality of cells in one transmission/reception point is formed as a homogeneous network. In a second CoMP scenario, one macro cell and one or more high-power RRHs are formed as a homogeneous network. In a third CoMP scenario and a fourth CoMP scenario, one macro cell and one or more low power RRHs in an area of the macro cell are formed as a heterogeneous network. When physical cell IDs of the RRHs are not equal to physical cell IDs of the macro cell, the CoMP corresponds to the third CoMP scenario. When the physical cell IDs of the RRHs are equal to the physical cell IDs of the macro cell, the CoMP corresponds to the fourth CoMP scenario.

A category of CoMP includes Joint Processing (JP), Coordinated Scheduling/Beamforming (CS/CB), and a combination of the JP and the CS/CB.

In the JP, data for a UE is available to at least one transmission/reception point of the CoMP set in a specific time-frequency resource. The JP includes Joint Transmission (JT), Dynamic Point Selection (DPS), and Dynamic Point Scheduling/Dynamic Point Blanking (DPS/DPB). The JT denotes that data is transmitted from multi transmission/reception points belonging to a CoMP set to one UE or a plurality of UEs in the time-frequency resource at the same time. In the case of JT, multiple cells (e.g., multiple transmission/reception points) transmit data to one UE using the same time/frequency resource. In the case of DPS, data is transmitted from one transmission/reception point of the CoMP set in the time-frequency resource. One transmission/reception point can be changed to the other at each sub-frame based on interference. Transmission data can be used by a plurality of transmission/reception points at the same time. The DPS includes Dynamic Cell Selection (DCS). In the case of CS, data is transmitted from one transmission/reception point in a CoMP set with respect to the time-frequency resource, and user scheduling is determined on the basis of coordination between the transmission/reception points of the corresponding CoMP set. In the case of CB, user scheduling is determined on the basis of coordination between the transmission/reception points of the corresponding CoMP set. The CB enables avoidance of interference generated between UEs of neighboring cells. The CS/CB may include Semi-Static Point Selection (SSPS) which can semi-statically select and change the transmission/reception point.

As described above, operations of the JP and the CS/CB may be performed simultaneously. For example, some transmission/reception points in the CoMP set may transmit data to a target terminal according to the JP, and other transmission/reception points in the CoMP set may perform operations of the CS/CB.

The transmission/reception point may include a base station (a macro base station or a micro base station (a local base station)), a cell, or a RRH. Meanwhile, a plurality of base stations may be multi transmission/reception points, and a plurality of RRHs may be multi transmission/reception points. All base stations or all operations of the RRHs described in the present disclosure may be equally applied to other types of transmission/reception points.

Figure 2:
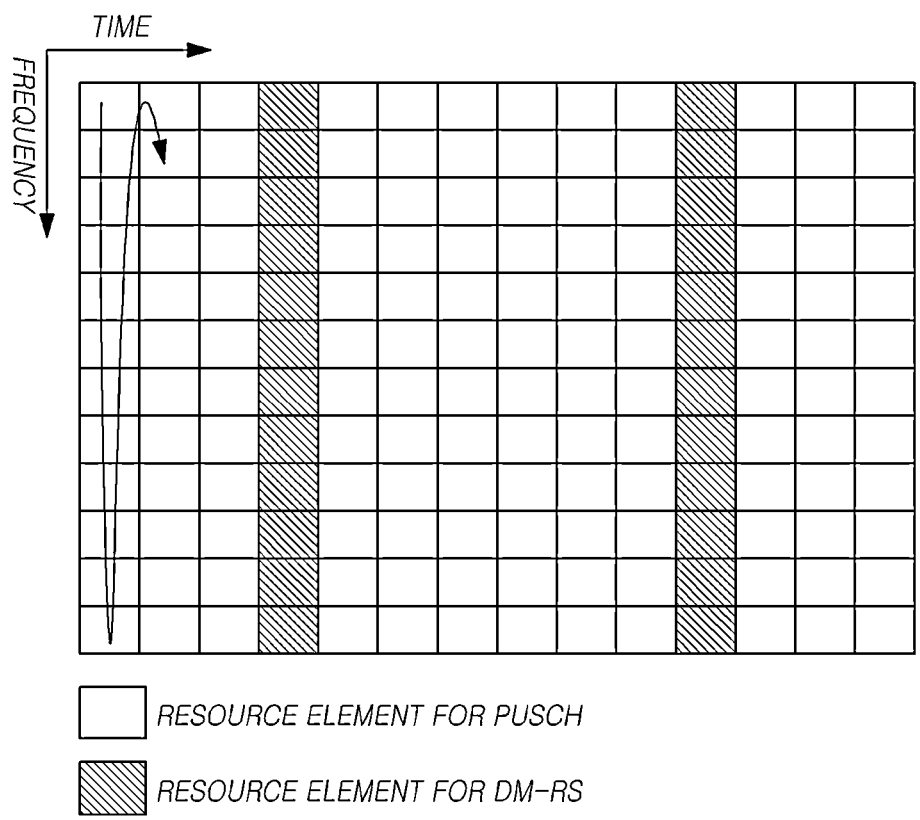
FIG. 2 and FIG. 3 illustrate transmission schemes of the Physical Uplink Shared CHannel (PUSCH), the DeModulation-Reference Signal (DM-RS), and the Sounding Reference Signal (SRS)
Figure 3:
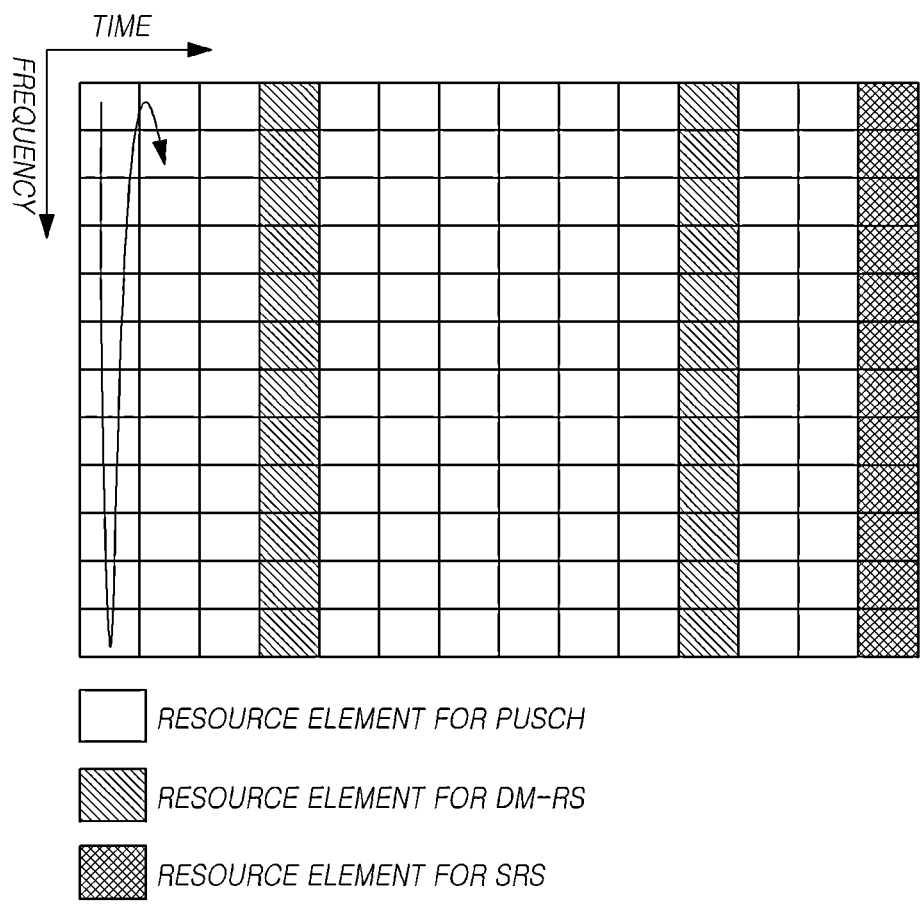

FIG. 2 and FIG. 3 illustrate transmission schemes of a Physical Uplink Shared CHannel (PUSCH), a DeModulation-Reference Signal (DM-RS), and a Sounding Reference Signal (SRS). In FIG. 2 and FIG. 3, a horizontal axis is a time axis and denotes a symbol. A vertical axis is a frequency axis and denotes entirely one Resource Block (RB).

A radio frame includes 10 sub-frames. One sub-frame includes two slots. A time for transmitting one sub-frame refers to a Transmission Time Interval (TTI). For example, the length of one sub-frame is about 1 ms, and the length of one slot is about 0.5 ms.

One slot may include a plurality of symbols in a time region. For example, in the case of a wireless system using the OFDMA in the DownLink (DL), a symbol may be an Orthogonal Frequency Division Multiplexing (OFDM) symbol. Meanwhile, expression of a symbol period of a time region is not limited by a multi access scheme or name. For example, a plurality of symbols in the time region may be a Single Carrier-Frequency Division Multiple Access (SC-FDMA) symbol, a symbol section, etc. in addition to the OFDM symbol.

The number of OFDM symbols included in one slot may be changed according to the length of a Cyclic Prefix (CP). For example, in the case of a normal CP, one slot may include 7 OFDM symbols, and in the case of an extended CP, one slot may include 6 OFDM symbols.

The RB is a resource allocation unit. The RB includes one slot as a time axis, and a time-frequency resource corresponding to about 180 kHz as a frequency axis. For example, when one slot includes 7 symbols as a time axis and a part corresponding to about 180 kHz includes 12 subcarrier waves as a frequency axis, one resource block may include 7×12 Resource Elements (REs).

The resource element denotes the smallest time-frequency unit to which a modulation symbol of a data channel or a modulation symbol of a control channel is mapped.

A wireless communication system 100 needs to estimate an uplink channel or a downlink channel in order to perform transmission/reception of data, system synchronization acquisition, channel information feedback, etc. Channel estimation may denote a process of compensating for distortion of a signal generated by change in a channel environment to restore a transmission signal. Further, it is also necessary to estimate a channel state for a cell to which a UE belongs or channel states of other cells. In general, a Reference Signal (RS) between a UE and a transmission/reception point is used to estimate a channel or measure a channel state.

Such a RS is generated from a reference signal sequence and is transmitted. As the reference signal sequence, at least one of various types of sequences having excellent correlation characteristic may be used. For example, reference signal sequence may include a Zadoff-Chu sequence, a Constant Amplitude Zero Auto-Correlation (CAZAC) sequence, and a Pseudo Noise (PN) sequence (e.g., an m-sequence, a gold sequence, and a Kasami sequence). In addition, other sequences having excellent correlation characteristic may be used according to a situation of a system. Further, the RS sequence may be used while being cyclic-extended or truncated in order to adjust the length of the sequence, and may be modulated into various forms such as Binary Phase Shift Keying (BPSK) and Quadrature Phase Shift Keying (QPSK) and be mapped to the RE.

Examples of uplink physical signals transmitted from a UE to a transmission/reception point include a DM-RS for demodulating an uplink physical channel and a SRS for measuring an uplink channel state.

The uplink DM-RS is associated with Physical Uplink Shared CHannel (PUSCH) transmission or Physical Uplink Control CHannel (PUCCH) transmission. The uplink DM-RS is mainly transmitted for channel estimation for demodulation. At this time, an uplink DM-RS is transmitted to each slot in each sub-frame for transmitting a PUSCH or a PUCCH. Further, information on a DM-RS transmission bandwidth expressed in a resource block unit is associated with the PUSCH transmission or the PUCCH transmission. For example, in the case of an uplink DM-RS associated with the PUSCH, a DM-RS is transmitted at resource blocks where the PUSCH is allocated. Therefore, resource block allocation information of the uplink DM-RS is based on resource block allocation information of the PUSCH. At this time, such resource blocks where the PUSCH is allocated to each UE follow a field value for resource block allocation of Downlink Control Information (DCI).

The DCI is used differently according to a format thereof. The DCI has different fields defined therein. Table 1 represents DCI according to various formats.

TABLE 1

| DCI Format | Description |
|---|---|
| 0 | Used for scheduling of PUSCH(Uplink grant) |
| 1 | Used for scheduling of one PDSCH codeword of one cell |
| 1A | Used for compact scheduling of one PDSCH codeword of one cell and a random access procedure initialized by a PDCCH command |
| 1B | Used for compact scheduling of one PDSCH codeword of one cell using precoding information |
| 1C | Used for compact scheduling of one PDSCH codeword and for notifying change of MCCH |
| 1D | Used for compact scheduling of one PDSCH codeword of one cell including precoding and power offset information |
| 2 | Used for PDSCH scheduling for a UE configured in a spatial multiplexing mode |
| 2A | Used for PDSCH scheduling of a UE configured in a CDD mode having large delay |
| 2B | Used in transmission mode 8 (double layer transmission) |
| 2C | Used in transmission mode 9 (multi-layer transmission) |
| 3 | Used for transmitting a TPC command for PUCCH and PUSCH including power adjustment of 2 bits |
| 3A | Used for transmitting a TPC command for PUCCH and PUSCH including power adjustment of 1 bit |
| 4 | Used for scheduling of PUSCH(uplink grant). In particular, used for PUSCH scheduling for a UE configured in a spatial multiplexing mode |

Referring to Table 1, a DCI format 0 is for uplink scheduling information, a DCI format 1 is for scheduling of one PDSCH codeword, a DCI format 1A is for compact scheduling of one PDSCH codeword, a DCI format 1C is for very compact scheduling of DL-SCH, a DCI format 2 is for PDSCH scheduling in a closed-loop spatial multiplexing mode, a DCI format 2A is for PDSCH scheduling in an open-loop spatial multiplexing mode, and DCI formats 3 and 3A are for transmitting a Transmission Power Control (TPC) command for a uplink channel. A DCI format 4 is used for scheduling of a PUSCH, and especially, is used for PUSCH scheduling for a UE configured in a spatial multiplexing mode.

Fields of the DCI are sequentially mapped to n information-bits a0 to a(n-1), respectively. For example, when the DCI is mapped to 44 information-bits, fields of the DCI are sequentially mapped to a0 to a43. The DCI formats 0, 1A, 3 and 3A may have the same payload size. The DCI formats 0 and 4 may be called an uplink grant.

The PUSCH is transmitted to a region except for a PUCCH and SRS region of a system region. The PUCCH includes ACK (ACKnowledge)/NACK (Negative ACK) for a Hybrid Automatic Repeat reQuest (HARQ) operation, a Rank indicator corresponding to channel state information for downlink data scheduling, a Precoding Matrix Indicator (PMI), a Channel Quality Indication (CQI) information, etc., and the SRS is a signal for acquiring uplink channel information for each user for the entire band of a system and for adjusting uplink transmission timing.

Examples of a method for feeding back channel state information include a method for periodically performing transmission using a PUCCH and a method for aperiodically performing transmission using a PUSCH allocated for feedback according to a request of a transmission/reception point.

Referring to FIG. 1 and FIG. 2, each of the UEs 130, 132, 134, and 136 can transmit a PUSCH through a resource block indicated by an uplink grant of DCI formats 0 or 4 for each UE. An uplink DM-RS is a reference signal used for demodulating a PUSCH transmitted by each of the UEs 130, 132, 134, and 136. The uplink DM-RS may be transmitted at a resource block such as a PUSCH in a frequency axis and at one symbol of each of two slots within a sub-frame in a time axis.

In resource mapping for PUSCH transmission, with respect to a resource block allocated for uplink PUSCH transmission of a predetermined terminal (e.g., the UE 136), the UE 136 sequentially maps a modulated signal to remaining REs except for Res allocated for uplink DM-RS as shown in FIG. 2 from the lowest subcarrier wave according to a priority of the frequency.

Referring to FIG. 1 and FIG. 3, each of the UEs 130, 132, 134, and 136 transmits a DM-RS and a SRS. The DM-RS is a reference signal used for demodulating a PUSCH in order to perform uplink transmission. The SRS is a signal for acquiring uplink channel information and adjusting uplink transmission timing for each user with respect to the entire band or a part of the entire band of a system. The SRS transmitted by each of UEs 130, 132, 134, and 136 may be transmitted from a last symbol of the corresponding sub-frame.

However, when transmission of a SRS is predicted to avoid collision between a PUSCH of the a UE and an SRS transmitted from another UE, that is, when an RB overlaps a sub-frame configured as a cell-specific SRS region by "srs-BandwidthConfig" and "srs-SubframeConfig", which are cell-specific SRS configuration parameters configured by higher layer signaling, PUSCH resources are mapped to the remaining REs except for the DM-RS symbol as well as a last SC-FDMA symbol.

Figure 4:
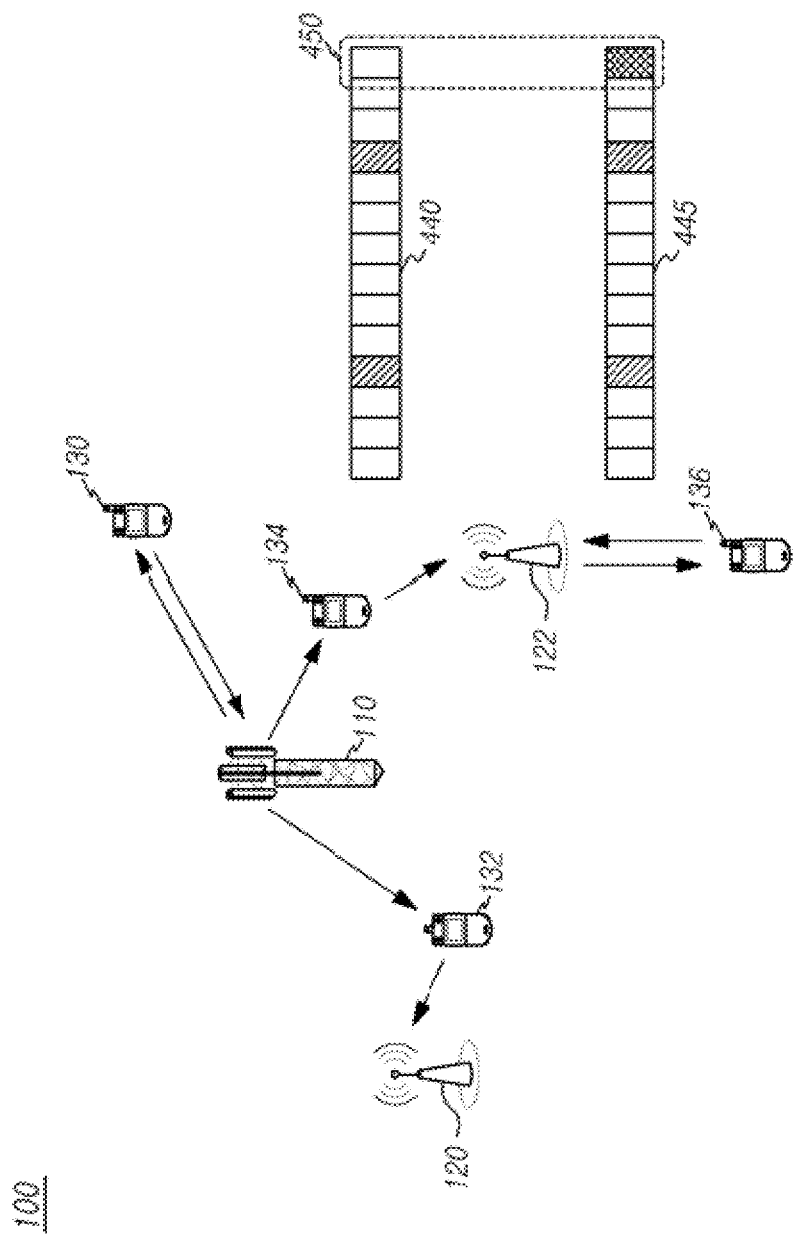
FIG. 4 illustrates ambiguity of PUSCH resource mapping according to a cell-specific sounding reference signal configuration when a cell-specific sounding reference signal parameter of a transmission point is different from a cell-specific sounding reference signal parameter of a reception point during an uplink cooperative communication in a wireless communication system of FIG. 1.

FIG. 4 illustrates ambiguity of PUSCH resource mapping according to a cell-specific sounding reference signal configuration when a cell-specific sounding reference signal parameter of a transmission point is different from a cell-specific sounding reference signal parameter of a reception point during an uplink cooperative communication in a wireless communication system of FIG. 1.

Referring to FIG. 4, in the case of a UE 130 belonging to a predetermined first transmission/reception point 110, the UE 130 receives, from the first transmission/reception point 110, downlink transmission, for example, a downlink physical channel and a downlink physical signal, and transmits, to the first transmission/reception point 110, uplink transmission, for example, a uplink physical channel and a physical signal.

Lately, for improving system throughput and obtain a small cell based cell splitting gain by a distributed antenna system, there are many research on a CoMP scenario and a heterogeneous network, on which the second transmission/reception points 120 and 122, e.g., RRHs, form respective small cells while overlapping a macro cell, e.g., the first transmission/reception point 110, e.g., a macro cell by an eNB. In particular, there are research for actively developing various cooperative communication technologies, which are related to a CoMP scenario 4 in which an eNB 110 and the respective RRHs 120 and 122 use the same cell ID and a CoMP scenario 3 in which the eNB 110 and the respective RRHs 120 and 122 use different cell IDs. Also, there are many specifications defined for signaling for supporting the various cooperative communication technologies.

In other words, in the cooperative communication, a downlink coverage is not matched with an uplink coverage due to difference between cell sizes of a high power cell (e.g., a large cell such as a macro cell) and a low power cell (e.g., a small cell such as a pico/micro cell). For example, although a predetermined terminal has the best downlink channel quality of a first transmission/reception point, the uplink channel quality and the geometry with a second transmission/reception point may be better for the predetermined terminal than the first transmission/reception point. In this case, the predetermined terminal may receive a downlink physical channel and signal from the first transmission/reception point and transmit an uplink physical channel and signal to the second transmission/reception point. That is, one transmission/reception point is used as a transmission point and another transmission/reception point is used as a reception point. To this end, it may be required to modify a typical method of transmitting an uplink physical channel.

For example, in the wireless communication system 100, each of the UEs 130, 132, 134 and 136 receives downlink transmission from specific transmission/reception points 110, 120, and 122, and some UEs 132 and 134 among the UEs 130, 132, 134 and 136 transmit an uplink channel and a signal, not to the transmission/reception point from which the downlink transmission is received, but to other transmission/reception points 120 and 122 which is different from the transmission/reception point 110 and have a better channel quality and better geometry. In this regard, in the case of a UE which uses a transmission/reception point as a transmission point and uses the other transmission/reception point as a reception point, a cell-specific SRS parameter is configured by system information of the transmission/reception point corresponding to a transmission point and a physical uplink data channel is transmitted to the transmission/reception point corresponding to a reception point. Therefore, when cell-specific SRS parameters of the transmission point and the reception point are different from each other, a physical uplink data channel resource mapping rule according to cell-specific SRS configuration may be ambiguous.

For example, when the UE 136 in addition to the UE 134 simultaneously perform uplink transmission to the transmission/reception point corresponding to a reception point, the UE 134 receives downlink transmission from the transmission/reception point 110 corresponding to a transmission point. Therefore, when the uplink transmission to the transmission/reception point 122 corresponding to a reception point is performed, if cell-specific SRS parameters of the transmission/reception point corresponding to a transmission point and the transmission/reception point corresponding to a reception point are different from each other, a PUSCH resource mapping rule according to cell-specific SRS configuration may be ambiguous.

In detail, when one UE 134 belonging to the first transmission/reception point 110 performs uplink data signal transmission of a specific resource block 440 to the second transmission/reception point 122, if the corresponding specific resource block 440 is not configured as a cell-specific SRS transmission region according to cell-specific SRS configuration information received from the first transmission/reception point 110, the corresponding UE 134 performs the PUSCH mapping for the corresponding data signal transmission up to the last symbol and transmits a data signal. However, the corresponding region is configured as a cell-specific SRS transmission region by the second transmission/reception point 122. Accordingly, when the specific UE 136 in a cell coverage area of the corresponding second transmission/reception point transmits a SRS using the last symbol of the corresponding resource block 445, collision between a PUSCH and the SRS may be generated in the last symbol 450 of the corresponding sub-frame with respect to the second transmission/reception point 122.

Thus, when a UE, which has received a downlink wireless channel and a wireless signal from a first transmission/reception point, transmits an uplink channel and a signal to a second transmission/reception point which is different from the first transmission/reception point and has higher channel quality and higher geometry, it is necessary to solve the ambiguity of a physical uplink data channel resource mapping rule of the aforementioned corresponding UE.

Figure 5:
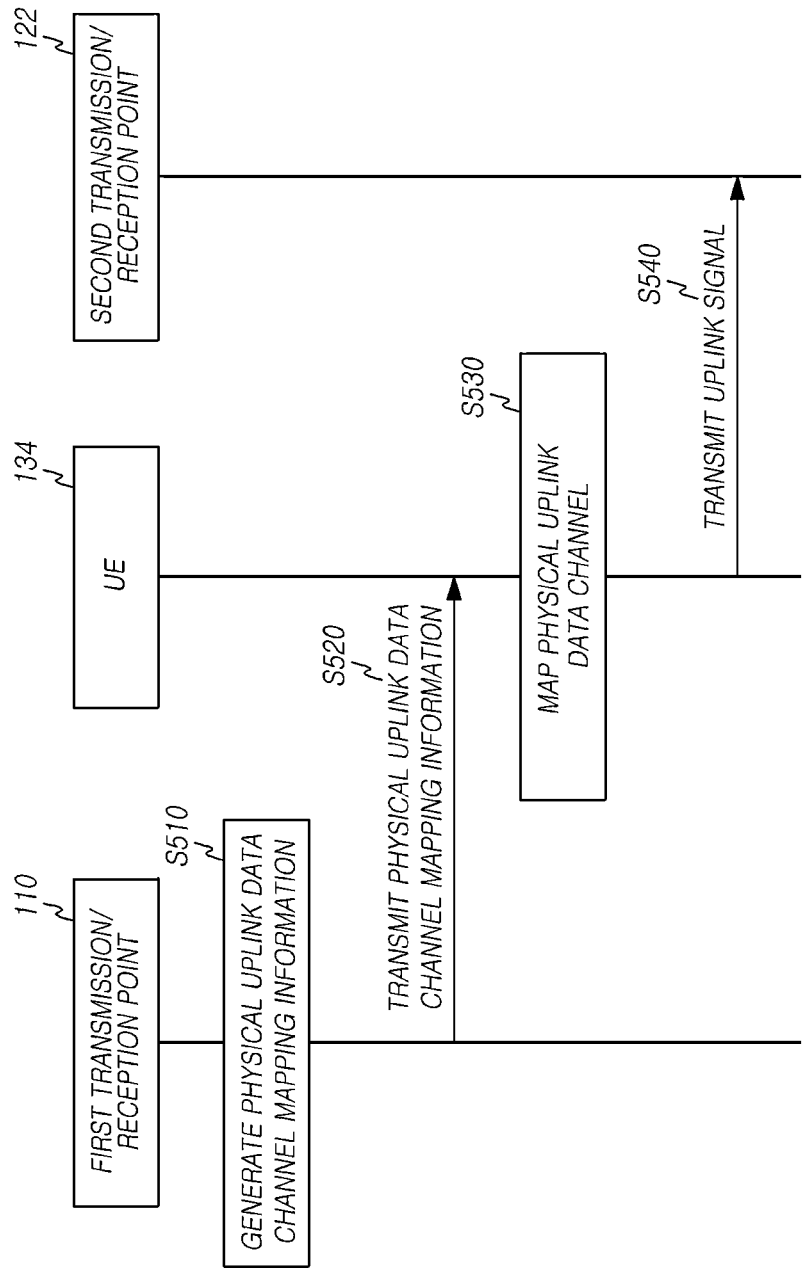
FIG. 5 is a signal flow chart illustrating a method of providing mapping information of a physical uplink data channel by a transmission/reception point and a method of transmitting a physical uplink data channel by a terminal during uplink cooperative transmission according to an embodiment of the present disclosure.

FIG. 5 is a signal flow chart illustrating a method of providing mapping information of a physical uplink data channel by a transmission/reception point and a method of transmitting a physical uplink data channel by a terminal during uplink cooperative transmission according to an embodiment of the present disclosure.

Referring to FIG. 5, a first transmission/reception point 110 is a serving transmission/reception point of a UE 134. The UE 134 transmits a physical uplink data channel using a second transmission/reception point 122 as a reception point. In such uplink cooperative communication, the first transmission/reception point 110 (e.g., transmission point of the UE 134) may generate uplink physical data channel mapping information (e.g., PUSCH mapping information) of the second transmission/reception point 122 which is a reception point of the UE 134 (S510). For example, the PUSCH mapping information may include information on a cell-specific SRS parameter of the second transmission/reception point 122 serving as a reception point. The cell-specific SRS parameter of the second transmission/reception point 122 includes SRS sub-frame configuration information and SRS bandwidth configuration information.

For example, the SRS sub-frame configuration information may be expressed as a SRS transmittable sub-frame using a period $T_{SFC}$ and an offset $\Delta_{SFC}$. Table 2 and Table 3 show SRS sub-frame configuration information where cell-specific SRS transmittable sub-frames are defined in a Frequency Division Duplex (frame structure type 1) and a Time Division Duplex (frame structure type 2). The cell-specific SRS transmittable sub-frames are expressed using a period $T_{SFC}$ and an offset $\Delta_{SFC}$.

TABLE 2

| srs-sub-frameConfig | Binary | Configuration Period $T_{SFC}$ (subframes) | Transmission offset $\Delta_{SFC}$ (subframes) |
|---|---|---|---|
| 0 | 0000 | 1 | (0) |
| 1 | 0001 | 2 | (0) |
| 2 | 0010 | 2 | (1) |
| 3 | 0011 | 5 | (0) |
| 4 | 0100 | 5 | (1) |
| 5 | 0101 | 5 | (2) |
| 6 | 0110 | 5 | (3) |
| 7 | 0111 | 5 | (0,1) |
| 8 | 1000 | 5 | (2,3) |
| 9 | 1001 | 10 | (0) |
| 10 | 1010 | 10 | (1) |
| 11 | 1011 | 10 | (2) |
| 12 | 1100 | 10 | (3) |
| 13 | 1101 | 10 | (0,1,2,3,4,6,8) |
| 14 | 1110 | 10 | (0,1,2,3,4,5,6,8) |
| 15 | 1111 | reserved | reserved |

TABLE 3

| srs-sub-frameConfig | Binary | Configuration Period $T_{SFC}$ (subframes) | Transmission offset $\Delta_{SFC}$ (subframes) |
|---|---|---|---|
| 0 | 0000 | 5 | (1) |
| 1 | 0001 | 5 | (1,2) |
| 2 | 0010 | 5 | (1,3) |
| 3 | 0011 | 5 | (1,4) |
| 4 | 0100 | 5 | (1,2,3) |
| 5 | 0101 | 5 | (1,2,4) |
| 6 | 0110 | 5 | (1,3,4) |
| 7 | 0111 | 5 | (1,2,3,4) |
| 8 | 1000 | 10 | (1,2,6) |
| 9 | 1001 | 10 | (1,3,6) |
| 10 | 1010 | 10 | (1,6,7) |
| 11 | 1011 | 10 | (1,2,6,8) |
| 12 | 1100 | 10 | (1,3,6,9) |
| 13 | 1101 | 10 | (1,4,6,7) |
| 14 | 1110 | reserved | reserved |
| 15 | 1111 | reserved | reserved |

In Table 2 and Table 3, the total number of total possible SRS subframe configuration information is 16 and is expressed with 4 bits. For example, in Table 1, when a value of srs-SubframeConfig is 7 (0111), the period $T_{SFC}$ is 5, and an offset $\Delta_{SFC}$ is {0, 1}. It implies that a SRS is transmitted from the first sub-frame and the second sub-frame by configuring 5 sub-frame units as a period.

The SRS bandwidth configuration information is information on a RB for transmitting the SRS. For example, the SRS bandwidth configuration information includes the total number of cell-specific RBs available to a cell and the number and the location of RBs allocated to each UE among the cell-specific RBs. At this time, the available cell-specific RBs correspond to signaled specific RBs among RBs corresponding to the entire system bandwidth. For example, when the system bandwidth corresponds to 50 RBs and the number of signaled RBs is 48, 48 RBs among the 50 RBs become total used cell-specific RBs.

For example, Table 4 shows the SRS bandwidth configuration information when the system bandwidth corresponds to 40 to 60 RBs.

TABLE 4

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Different tables may be defined according to each system bandwidth. The total number of used cell-specific RBs may be transmitted as a parameter value, which is $C_{SRS}$. The number of RBs used for each UE among cell-specific RBs is defined as a parameter which is $B_{SRS}$. For example, in Table 4, when $C_{SRS}$ is 1 and $B_{SRS}$ is 2, the number $m_{SRS,0}$ of cell-specific RBs used for entire SRS transmission is 48, and the number $m_{SRS,2}$ of RBs used for a specific UE is 8. Separately, a parameter $n_{RRC}$ may be defined to express a location of a RB used for each UE. Such parameters $C_{SRS}$, $B_{SRS}$, $n_{RRC}$ may be transmitted through high layer signaling (e.g., Radio Resource Control (RRC)). PUSCH mapping information may be information indicating whether a PUSCH resource is mapped to the last SC-FDMA symbol of an uplink resource block.

For example, the PUSCH mapping information may be a value of a specific bit that indicates whether a PUSCH resource is mapped with respect to the corresponding last SC-FDMA symbol. The specific bit may be included in a DCI format corresponding to an uplink grant. The uplink grant is resource allocation information of a PUSCH transmitted to the second transmission/reception point 122 serving as a reception point. For example, PUSCH mapping information may be 1 bit of an indication field.

Table 5 is an example of values of specific bits indicating whether the PUSCH resource is mapped with respect to the last SC-FDMA symbol, for example, 1 bit of indication field.

TABLE 5

| Indication Field | Information |
| --- | --- |
| 0 | PUSCH resource is mapped to the last SC-FDMA symbol |
| 1 | PUSCH resource is not mapped to the last SC-FDMA symbol |

As another example, information notifying whether a second transmission/reception point 122 different from a first transmission/reception point 110 which is a serving transmission/reception point 110 of the UE as a reception point (information notifying uplink cooperative communication) or information used for configuring the second transmission/reception point 122 different from the first transmission/reception point 110 as a reception point may be indirectly used as PUSCH mapping information. For example, information used for configuring the second transmission/reception point 122 different from the first transmission/reception point 110 as a reception point may be a virtual cell identity.

As another example, types of C-RNTI used for calculating of Cyclic Redundancy Check (CRC) attached to the DCI indicating the uplink grant for PUSCH resource allocation of the corresponding UE may be used as the PUSCH mapping information indicating whether the PUSCH resource is mapped with respect to the last SC-FDMA symbol.

Further, DCI attached with a CRC calculated by C-RNTI may be indirectly used as the PUSCH mapping information. The above C-RNT is different from C-RNT allocated at initial entry.

For example, a UE is configured to have the first transmission/reception 110 as a transmission point and the second transmission/reception point as a reception point. A first C-RNTI is allocated to the UE at initial entry (including handover) to the transmission point. A second C-RNTI, different from the first C-RNTI, is allocated. When performing uplink transmission for allocating PUSCH resource to a corresponding UE, a CRC calculated using one of the first C-RNTI and the second C-RNTI according to whether a PUSCH resource can be mapped with respect to the last SC-FDMA symbol, and the calculated CRC is attached to DCI indicating the corresponding uplink grant.

For example, when resource mapping for allocated PUSCH transmission is performed using up to the last symbol of the SC-FDMA, the first transmission/reception point 110 uses the first C-RNTI to calculate the CRC attached to the DCI indicating the uplink grant. Further, when the resource mapping for the PUSCH transmission is performed using symbols except for the last symbol of the SC-FDMA, the first transmission/reception point 110 use the second C-RNTI to calculate the CRC attached to the DCI indicating the uplink grant.

The first transmission/reception point 110 transmits the PUSCH mapping information to a UE 134 (S520). The UE 134 receives the PUSCH mapping information from the first transmission/reception point in step S520.

The first transmission/reception point 110 may transmit the PUSCH mapping information to the UE 134 using various methods according to the aforementioned examples of PUSCH mapping information.

When the PUSCH mapping information is a cell-specific SRS parameter of the second transmission/reception point 122 serving as a reception point, which includes the SRS sub-frame configuration information and the SRS bandwidth configuration information, the first transmission/reception point 110 serving as a transmission point can transmit a cell-specific SRS parameter of the second transmission/reception point serving as a reception point for the corresponding UE to the UE 134 through UE-specific higher layer signaling in step 520.

For example, the UE-specific high layer signaling may be a UE-specific RRC including a cell-specific parameter of "SoundingRS-UL-ConfigDedicated". At this time, "SoundingRS-UL-ConfigDedicated" may include "srs-SubframeConfig" which is the SRS sub-frame configuration information and "srs-BandwidthConfig" which is the SRS bandwidth configuration information as in Table 6.

TABLE 6

```
SoundingRS-UL-ConfigDedicated ::=  CHOICE {
    release                         NULL,
    setup                           SEQUENCE {
        srs-BandwidthConfig             ENUMERATED {bw0, bw1,
                                        bw2, bw3, bw4, bw5, bw6,
                                        bw7},
        srs-SubframeConfig              ENUMERATED {
                                        sc0, sc1, sc2, sc3, sc4,
                                        sc5, sc6, sc7, sc8, sc9,
                                        sc10, sc11, sc12, sc13,
                                        sc14, sc15},
    }
}
```

In "srs-subframeConfig" which is the SRS sub-frame configuration information, sc0 corresponds to a value of 0 of Table 2 (FDD) and Table 3 (TDD), and sc1 corresponds to a value of 1 of Table 2 and Table 3. Sc2 to sc15 corresponds to 2 to 15 of Table 2 and Table 3.

In "srs-BandwidthConfig" which is the SRS bandwidth configuration information, bw0 corresponds to a value of 0 of Table 4, and bw1 corresponds to a value of 1 of Table 4. Bw2 to bw7 correspond to 2 to 7 of Table 4.

When the PUSCH mapping information is the 1 bit indication field of Table 5, the first transmission/reception point 110 can include this indication field in a DCI format indicating an uplink grant (e.g., a DCI format 0 or 4) and transmit the DCI format to the UE through a PDCCH or an ePDCCH in step S520. At this time, whether the corresponding PUSCH mapping information indication field is included in the uplink grant can be configured through UE-specific high layer signaling. However, the ePDCCH denotes a physical downlink control channel allocated not to a control region but to a data region of the sub-frame. In the present specification, the physical downlink control channel includes a PDCCH allocated to the control region of the sub-frame as well as an ePDCCH allocated to a data region.

Figure 6:
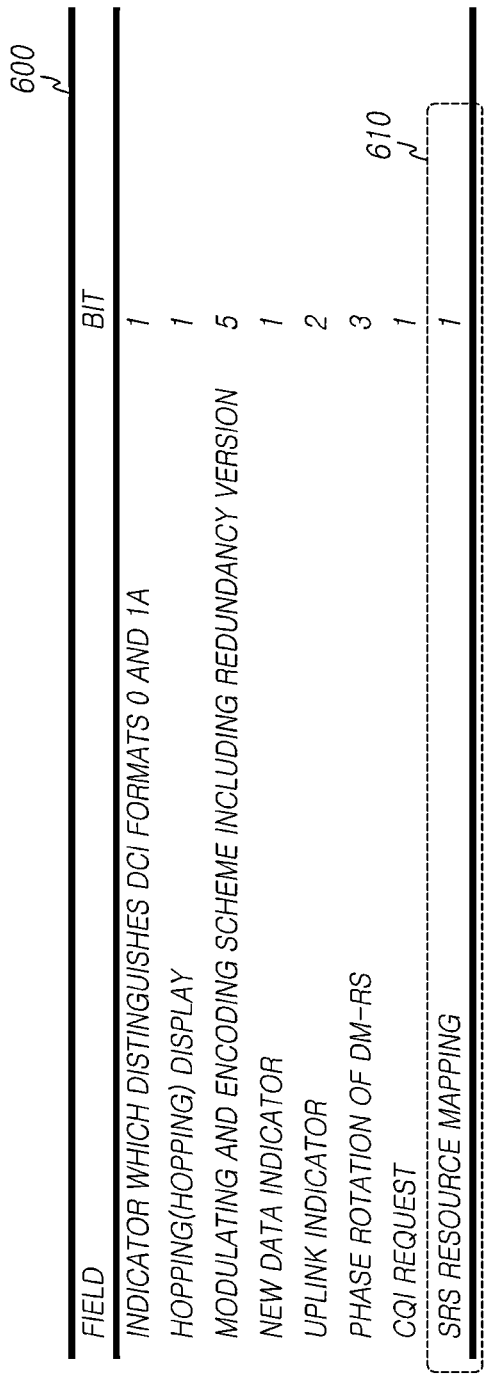
FIG. 6 is a format of Downlink Control Information (DCI) including PUSCH mapping information of FIG. 5.

FIG. 6 is a format of Downlink Control Information (DCI) including PUSCH mapping information of FIG. 5.

For example, when a DCI format indicating an uplink grant is a DCI format 0, as illustrated in FIG. 6, the DCI format 0 600 may include an indicator field which distinguishes DCI formats 0 and 1A from each other, a hopping indication field, a modulation and encoding scheme field including a redundancy version, a new data indicator field, an uplink indicator field, a DM-RS phase rotation field, a CQI request field, and an indication field 610 indicating whether the PUSCH resource in Table 5 is mapped or not.

When information notifying whether the second transmission/reception point 122 different from the first transmission/reception point 110 belonging to the UE as a reception point or information used for configuring the second transmission/reception point different from the first transmission/reception point 110 as a reception point is indirectly used as the PUSCH mapping information, the first transmission/reception point 110 can transmit, to the UE 134, the information notifying whether the transmission/reception point 122 different from the first transmission/reception point 110 to which the UE belongs is configured as a reception point or information used for configuring the second transmission/reception point 122 different from the first transmission/reception point 110 is configured as a reception point, thereby indirectly transmitting the PUSCH mapping information to the UE 134 in step S520.

In the aforementioned example, the information used for configuring the second transmission/reception point 122 different from the first transmission/reception point 110 corresponds to virtual cell identity, the first transmission/reception point 110 can transmit the virtual cell identity to the UE 134 through high layer signaling, e.g., RRC signaling or a PDCCH or ePDCCH. The UE 134 can configure the second transmission/reception point 122 different from the first transmission/reception point 110 as a reception point using the virtual cell identify received through the high layer signaling, e.g., RRC signaling, or the PDCCH or the ePDCCH and can use the virtual cell identity as the PUSCH mapping information.

When types of C-RNTIs used for calculating a CRC attached to DCI indicating an uplink grant for PUSCH resource allocation of the corresponding UE is used as the PUSCH mapping information indicating whether the PUSCH resource is mapped with respect to the last SC-FDMA symbol, the first transmission/reception point 110 can transmit a DCI format attached with the CRC calculated using a first C-RNTI to the UE 134 through a PDCCH or transmit a DCI format attached with the CRC calculated using a second C-RNTI to the UE 134 through a PDCCH, thereby implicitly transmitting the PUSCH resource mapping information to the UE 134.

A CRC is attached to each DCI payload, and bits are obtained by scrambling the DCI message payload to which the CRC is attached to the C-RNTI for identifying the UE. The obtained bits can be encoded to a tail-biting convolutional code and can be matched with an amount of resources used for PDCCH transmission through rate matching.

At this time, the DCI format indicating an uplink grant may be, for example, a DCI format 0 or a DCI format 4. At this time, a DCI format used as the PUSCH mapping information indicating whether the PUSCH resource is mapped with respect to the last SC-FDMA symbol according to types of C-RNTIs used may be the DCI format 4 having the DCI size different from that of other DCI formats. The reason is to reduce blind decoding complexity of the UE. In general, the US performs blind decoding six times at an Aggregation Level (AL) 1, six times at an AL 2, two times at an AL 4, and twice at an AL 8 in a UE-Specific Space (USS). However, the DCI format that the UE actually performs the blind decoding for each AL generally has 2 types. First, the blind decoding is performed with respect to a DCI format (e.g., a DCI format 2C) according to a PDSCH Transmission Mode (TM). Basically, the blind decoding is performed with respect to DCI formats 0/1A, which is called a fallback DCI format, regardless of the PDSCH TM. Here, the DCI format 0 is a DCI format corresponding to an uplink grant and the DCI format 1A is a DCI format corresponding to downlink scheduling. The sizes of both DCI formats are equal to each other, and thus, cannot be searched for by one blind decoding. Actually, after the blind decoding is performed to the size of the DCI format, whether the DCI format corresponds to a DCI format 0 corresponding to an uplink grant or a DCI format 1A corresponding to downlink scheduling can be identified through an indication field which distinguishes the DCI formats 0 and 1A of 1 bit in Table 5 of the corresponding PDCCH. Thus, the UE performs the blind decoding 32 times (16 (=6+6+2+2) times for the DCI format according to each PDSCH TM and 16 times for fallback DCI format). Meanwhile, when a newly-defined PUSCH TM 2 is configured, the corresponding USS additionally performs the blind decoding 16 times with respect to the DCI format 4, so that the blind decoding is performed 48 times.

Thus, in order to reduce the blind decoding complexity of the UE, not the DCI format 0 having the size equal to that of the DCI format 1A, but the DCI format 4 (e.g., a DCI format corresponding to an uplink grant) can be used as the PUSCH mapping information indicating whether the PUSCH resource is mapped with respect to the last SC-FDMA symbol according to types of the C-RNTI.

The UE 134 receives the PUSCH mapping information of the aforementioned examples in step S520. The UE maps a PUSCH resource to an RB according to the PUSCH mapping information (step S53) as shown in FIG. 2 or FIG. 3.

The UE 134 has received the cell-specific SRS parameter of the second transmission/reception point 122 serving as a reception point through UE-specific higher layer signaling. In step S520, the UE 134 flushes the cell-specific SRS sub-frame/bandwidth configuration information included in the cell-specific SRS parameter received through an SIB2 of the first transmission/reception point 110 serving as a transmission point and reconfigures the cell-specific SRS sub-frame/bandwidth configuration information included in a cell-specific SRS parameter of the second transmission/reception point 122 serving as a reception point, which is received through the UE-specific higher layer signaling.

The UE 134 has received the cell-specific SRS parameter of the second transmission/reception point 122. The UE 134 applies a PUSCH resource mapping rule on the basis of the reconfiguration information of the cell-specific SRS sub-frame/bandwidth included in the cell-specific SRS parameter of the second transmission/reception point 122 instead of a PUSCH resource mapping rule applied on the basis of the cell-specific SRS sub-frame/bandwidth configuration information included in the cell-specific SRS parameter received through a System Information Block 2 (SIB2) of the first transmission/reception point 110.

When the PUSCH resource mapping rule is applied, a signal modulated in a frequency priority mapping scheme is mapped with respect to other REs except for the last SC-FDMA symbol and the SC-FDMA symbol used as a DM-RS if a PUSCH resource overlapping with the cell-specific SRS sub-frame/bandwidth included in the cell-specific SRS parameter of a newly reconfigured second transmission/reception point 122 is allocated.

In the case of TDD, when a cell-specific SRS parameter received through an SIB2 of the first transmission/reception point 110 is "srs-subframeConfig=9" and "SRS bandwidth Configuration(Csrs)=6" and a cell-specific SRS parameter of the second transmission/reception point 134 is "srs-subframeConfig=5" and "SRS bandwidth Configuration(Csrs)=2", the UE 134, which is reconfigured by a cell-specific SRS parameter of the second transmission/reception point 134, consequentially maps a modulated signal in the frequency priority mapping scheme with respect to remaining REs except for the last SC-FDMA symbol and the SC-FDMA symbol used as a DM-RS from a period of 10 sub-frames for 20 RBs to a period of 5 sub-frames for 40 RBs.

When the PUSCH mapping information is 1 bit indication field in Table 5, the UE 134 maps or does not map the PUSCH resource to the last SC-FDMA symbol of the corresponding bandwidth of the uplink sub-frame indicated by the uplink grant according to an on/off value of the corresponding 1 bit indication field 610 in Table 5 of the DCI format corresponding to the uplink grant.

For example, the UE 134 configures a SRS on the basis of a cell-specific SRS parameter received through the SIB2 of the first transmission/reception point 110. Such UE 134 maps the PUSCH resource to the last SC-FDMA symbol of the corresponding bandwidth of the sub-frame indicated by the uplink grant when the value of the 1 bit indication field 610 in Table 5 of the DCI format corresponding to an uplink grant (e.g., DCI format 0 or 4) is on. UE 134 does not map the PUSCH resource to the last SC-FDMA symbol when the configuration value of the 1-bit indication field 610 denotes off.

However, in the case of the PUSCH transmission, which is not based on the uplink grant, e.g., retransmission by HARQ NACK, PUSCH transmission by Semi Persistent Scheduling (SPS), etc., the PUSCH resource can be mapped such that the configuration value included in the uplink grant for initial transmission or transmission before retransmission is equally applied to the PUSCH transmission not based on the related following uplink grant or the last SC-FDMA symbol is not used with respect to all PUSCH transmission not based on the uplink grant.

For example, when the uplink grant is received through the PDCCH of the downlink sub-frame before 4 sub-frames, the UE 134 performs the PUSCH transmission through the corresponding sub-frame.

However, in the case of not initial PUSCH transmission but PUSCH retransmission due to reception fail of the transmission/reception point serving as a reception point, synchronous non-adaptive retransmission is basically applied to the PUSCH. For example, a predetermined UE receives an uplink grant from a downlink sub-frame #0 and performs first PUSCH transmission to an uplink sub-frame #4 on the basis of the received uplink grant. When the corresponding transmission/reception point fails to perform the corresponding PUSCH decoding, the predetermined UE transmits NACK through a PHICH of a downlink sub-frame #8. Then, the UE retransmits the corresponding PUSCH having the DCI format of the uplink grant allocated at the initial transmission, from an uplink sub-frame #12, i.e., the sub-frame #2 of the next wireless frame even when the PDCCH of the corresponding downlink sub-frame #8 does not separately receive an uplink grant for retransmission.

The SPS is a scheduling method of allocating various resources at one time without downloading the same scheduling information at each time through a PDCCH when data having the similar size is periodically generated as in VoIP. That is, in the case of VoIP, since traffic is generally generated in about 20 ms unit, when the VoIP starts, a transmission resource is reserved in 20 ms unit at one time. Therefore, in general, whenever the PUSCH is transmitted, a downlink sub-frame before 4 sub-frames is not downloaded by an uplink grant, and after an initial one time, traffic is transmitted through the same resource until the session is terminated.

At this time, the PUSCH resource can be mapped such that a configuration value included in an uplink grant for the initial transmission or transmission before retransmission is equally applied to the PUSCH transmission not based on the related following uplink grant or the last SC-FDMA symbol is not used for all PUSCH transmission not on the basis of the uplink grant.

When information notifying whether the transmission/reception point 122 different from the first transmission/reception point 110 to which the UE belongs is configured as a reception point or information used for configuring the second transmission/reception point 122 different from the first transmission/reception point 110 is configured as a reception point is indirectly used as PUSCH mapping information, a PUSCH resource mapping rule for the PUSCH transmission can be newly redefined. For example, the PUSCH resource can be mapped to REs allocated for a DM-RS with respect to a RB(s) allocated for the corresponding PUSCH transmission and remaining REs except for REs corresponding to the last SC-FDMA symbol in the frequency priority scheme.

In other words, a predetermined UE follows the existing PUSCH resource mapping rule when a transmission point and a reception point are equally configured as a transmission/reception point, and can map the PUSCH resource to remaining REs except for REs allocated for a DM-RS with respect to a RB(s) allocated for the corresponding PUSCH transmission and REs corresponding to the last SC-FDMA symbol according to a new PUSCH resource mapping rule in the frequency priority scheme when the transmission point and the reception point is differently configured as transmission/reception points.

The UE 134 has received the information notifying whether the transmission/reception point 122 different from the first transmission/reception point 110 to which the UE belongs is configured as a reception point or the information (e.g., a virtual cell identity) used for configuring the second transmission/reception point 122 different from the first transmission/reception point 110 as a reception point. Such UE 134 can map the PUSCH resource to the remaining REs except for REs allocated for a DM-RS with respect to a RB(s) allocated for the corresponding PUSCH transmission and REs corresponding to the last SC-FDMA symbol in the frequency priority scheme according to a new PUSCH resource mapping rule instead of a PUSCH resource mapping rule applied on the basis of the cell-specific SRS sub-frame/bandwidth configuration information included in the cell-specific SRS parameter received through the SIB2 of the first transmission/reception point 110.

When the types of the C-RNTI used for calculating the CRC attached to the DCI indicating the uplink grant for the PUSCH resource allocation of the corresponding UE (the types of C-RNTI used for generating the CRC) is used as the PUSCH mapping information indicating whether the PUSCH resource is mapped to the last SC-FDMA symbol, the UE allocated with the additional second C-RNTI separately from the first C-RNTI performs blind decoding with respect to a DCI format corresponding to an uplink grant (e.g., a DCI format 0 or 4) on the basis of the first C-RNTI as well as performs additional blind decoding on the basis of the newly-allocated second C-RNTI when performing blind decoding for a UE-specific search space or a common search space of the PDCCH. At this time, when receiving the DCI using the first C-RNTI, the corresponding UE applies the PUSCH resource mapping for the allocated PUSCH transmission using up to the last symbol of the SC-FDMA, and when receiving the DCI using the second C-RNTI, the corresponding UE applies the PUSCH resource mapping for the PUSCH transmission with respect to remaining symbols except for the last symbol of the SC-FDMA.

In this case, the PUSCH resource can be mapped such that a configuration value included in an uplink grant for the initial transmission or transmission before retransmission is equally applied to the PUSCH transmission not based on the related following uplink grant or the last SC-FDMA symbol is not used for PUSCH transmission not on the basis of the all uplink grant.

Meanwhile, in order to reduce a load of the decoding, the number of performing blind decoding on the basis of the corresponding second C-RNTI with respect to each AL may be limited or a search space (e.g., only a common search space or only a UE-specific search space) for blind decoding based on the second C-RNTI may be limited.

The UE 134 performs uplink transmission including the PUSCH mapped to the RB in step S530 to the second transmission/reception point 122 serving as a reception point (step S540).

Figure 7:
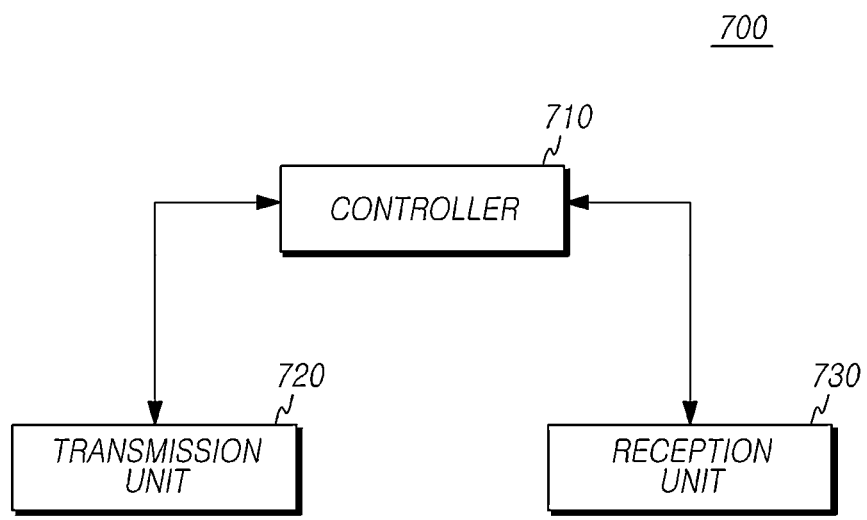
FIG. 7 is a block diagram illustrating a transmission/reception point according to embodiments.

FIG. 7 is a block diagram illustrating a transmission/reception point according to embodiments.

Referring to FIG. 7, a transmission/reception point 700 according to embodiments includes a controller 710, a transmission unit 720, and a reception unit 730.

The controller 710 controls a CoMP operation described in the aforementioned embodiments of the present disclosure and an overall operation of the transmission/reception point according to transmission of an uplink RS.

The transmission unit 720 and the reception unit 730 are used for transmitting to a UE and receiving from the UE various types of signals, messages, and data needed for performing operations described in the aforementioned embodiments of present disclosure.

The controller 710 generates PUSCH mapping information of a different transmission/reception point, which serves as a reception point for a specific UE and is different from a serving transmission/reception point of the specific UE, in uplink cooperative communication where the specific UE transmits a PUSCH to the different transmission/reception point serving as the reception point.

For example, the PUSCH mapping information may be a cell-specific SRS parameter of the different transmission/reception point serving as a reception point. The cell-specific SRS parameter of the different transmission/reception point includes SRS sub-frame configuration information and SRS bandwidth configuration information.

Such a cell-specific parameter of the different transmission/reception point may be transmitted through high-level signaling (e.g., Radio Resource Control (RRC)) from the transmission unit 720.

PUSCH mapping information may be information indicating whether a PUSCH resource is mapped or not to the last SC-FDMA symbol of an uplink resource block.

For example, the PUSCH mapping information may be the number of a specific bit, e.g., 1 bit indication field, indicating whether a PUSCH resource is mapped with respect to the corresponding last SC-FDMA symbol included in a DCI format corresponding to an uplink grant corresponding to resource allocation information on a PUSCH transmitted to the different transmission/reception point serving as a reception point.

For another example, information notifying whether the different transmission/reception point is configured as a reception point (information notifying uplink cooperative communication) or information used for configuring the different transmission/reception point as a reception point may be indirectly used as the PUSCH mapping information. For example, the information used for configuring the different transmission/reception point as a reception point may be a virtual cell identity.

For still another example, types of C-RNTI used for calculating of Cyclic Redundancy Check (CRC) attached to the DCI indicating the uplink grant for PUSCH resource allocation of the corresponding UE may be used as the PUSCH mapping information indicating whether the PUSCH resource is mapped with respect to the last SC-FDMA symbol.

Further, DCI attached with the CRC calculated by C-RNTI different from an initial C-RNTI allocated at a time of an initial entry is indirectly used as the PUSCH mapping information.

A UE is configured to have a different transmission/reception point as a reception point, which is different from a transmission/reception point serving as a transmission point. A first C-RNTI is allocated to the UE when the UE initial enters (including handover) to a transmission point. The UE is allocated with a second C-RNTI. When performing uplink transmission for the PUSCH resource allocation, a CRC to be attached to DCI indicating the corresponding uplink grant can be calculated using one of the first C-RNTI and the second C-RNTI according to whether a PUSCH resource can be mapped with respect to the last SC-FDMA symbol.

For example, when resource mapping is instructed to be performed for allocated PUSCH transmission using up to the last symbol of the SC-FDMA, the controller 710 uses the first C-RNTI to calculate the CRC attached to the DCI indicating the uplink grant. Further, when the resource mapping is instructed to be performed for the PUSCH transmission using symbols except for the last symbol of the SC-FDMA, the first transmission/reception point 110 use the second C-RNTI to calculate the CRC attached to the DCI indicating the uplink grant.

The transmission unit 720 transmits the PUSCH mapping information to the UE.

According to examples of the aforementioned PUSCH mapping information, the transmission unit 720 can transmit the PUSCH mapping information to the UE 134 through various methods.

When the PUSCH mapping information is a cell-specific SRS parameter of the another transmission/reception point serving as a reception point, which includes the SRS sub-frame configuration information and the SRS bandwidth configuration information, the transmission unit 720 can transmit a cell-specific SRS parameter of the different transmission/reception point serving as a reception point for the corresponding UE to the UE 134 through UE-specific higher layer signaling.

For example, the aforementioned UE-specific high layer signaling may be a UE-specific RRC including a cell-specific parameter of "SoundingRS-UL-ConfigDedicated". At this time, "SoundingRS-UL-ConfigDedicated" may include "srs-SubframeConfig" which is the SRS sub-frame configuration information and "srs-BandwidthConfig" which is the SRS bandwidth configuration information.

When the PUSCH mapping information is the 1-bit indication field of Table 5, the transmission unit can include this indication field in a DCI format indicating an uplink grant (e.g., a DCI format 0 or 4) and transmit the DCI format to the UE through a PDCCH or an ePDCCH. However, the ePDCCH denotes a physical downlink control channel allocated not to a control region but to a data region of the sub-frame. In embodiments of the present specification, the physical downlink control channel includes a PDCCH allocated to the control region of the sub-frame as well as an ePDCCH allocated to a data region.

When information notifying whether the different transmission/reception point is configured as a reception point or information used for configuring the different transmission/reception point as a reception point is indirectly used as the PUSCH mapping information, the transmission unit 720 transmits, to the UE, the information notifying whether the different transmission/reception point is configured as a reception point or the information used for configuring the different transmission/reception point as a reception point, thereby indirectly transmitting the PUSCH mapping information to the UE.

When the information used for configuring the different transmission/reception point as a reception point in the aforementioned example is a virtual cell identity, the transmission unit 720 can transmit the virtual cell identity to the UE through the higher layer signaling (e.g., the RRC signaling) or the PDCCH or the ePDCCH. The UE can configure the different transmission/reception point as a reception point using a virtual cell identity received through the higher layer signaling, e.g., the RRC signaling or the PDCCH or the ePDCCH and can use the virtual cell identity as the PUSCH mapping information.

When types of C-RNTIs used for calculating a CRC attached to DCI indicating an uplink grant for PUSCH resource allocation of the corresponding UE is used as the PUSCH mapping information indicating whether the PUSCH resource is mapped with respect to the last SC-FDMA symbol, the transmission unit 720 can transmit a DCI format attached with the CRC calculated using a first C-RNTI to the UE, through a PDCCH or transmit a DCI format attached with the CRC calculated using a second C-RNTI to the UE through a PDCCH, thereby implicitly transmitting the PUSCH resource mapping information to the UE.

The reception unit 730 receives an uplink physical channel and a physical signal from the UE.

Figure 8:
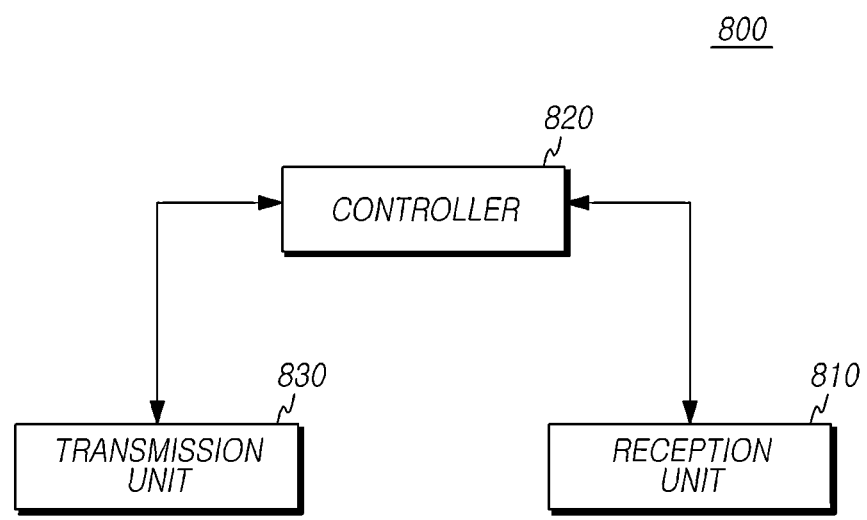
FIG. 8 is a block diagram illustrating a UE according to embodiments.

FIG. 8 is a block diagram illustrating a UE according to embodiments.

Referring to FIG. 8, a UE according to embodiments includes a reception unit 810, a controller 820, and a transmission unit 830.

The controller 820 controls a CoMP operation described in the aforementioned embodiments of the present disclosure and an overall operation of the UE according to transmission of an uplink RS.

The transmission unit 830 and the reception unit 810 are used for transmitting/receiving to/from a transmission/reception point a signal, a message, and data needed for performing operations described in the aforementioned embodiments of the present disclosure.

The reception point receives a cell-specific SRS parameter of a second transmission/reception point serving as a reception point through UE-specific higher layer signaling. Thereafter, the controller 820 flushes the cell-specific SRS sub-frame/bandwidth configuration information included in the cell-specific SRS parameter received through a SIB2 of the first transmission/reception point 110 serving as a transmission point, and reconfigures the cell-specific SRS sub-frame/bandwidth configuration information included in a cell-specific SRS parameter of the second transmission/reception point 122 serving as a reception point, which is received through the UE-specific higher layer signaling.

The controller 810, which has received the cell-specific SRS parameter of the second transmission/reception point, applies a PUSCH resource mapping rule on the basis of the reconfiguration information of the cell-specific SRS sub-frame/bandwidth included in the cell-specific SRS parameter of the second transmission/reception point instead of a PUSCH resource mapping rule applied on the basis of the cell-specific SRS sub-frame/bandwidth configuration information included in the cell-specific SRS parameter received through the SIB2 of the first transmission/reception point.

When the PUSCH resource mapping rule is applied, a signal modulated in a frequency priority mapping scheme is mapped with respect to other REs except for the last SC-FDMA symbol and the SC-FDMA symbol used as a DM-RS if a PUSCH resource overlapping with the cell-specific SRS sub-frame/bandwidth included in the cell-specific SRS parameter of a newly-reconfigured second transmission/reception point is allocated.

When the PUSCH mapping information is 1 bit indication field in Table 5, the UE maps or does not map the PUSCH resource to the last SC-FDMA symbol of the corresponding bandwidth of the uplink sub-frame indicated by the uplink grant according to an on/off value of the 1 bit indication field in Table 5 of the DCI format corresponding to the uplink grant.

For example, when a SRS is configured on the basis of a cell-specific SRS parameter received through the SIB2 of the first transmission/reception point 110, the controller 820 maps the PUSCH resource to the last SC-FDMA symbol of the corresponding bandwidth of the sub-frame indicated by the uplink grant if a value of the 1 bit indication field of the DCI format is on. The controller 820 does not map the PUSCH resource to the last SC-FDMA symbol of the corresponding bandwidth of the sub-frame indicated by the uplink grant when the value of the 1 bit indication field denotes off.

However, in the case of the PUSCH transmission, which is not based on the uplink grant (e.g., retransmission by HARQ NACK, PUSCH transmission by Semi Persistent Scheduling (SPS), etc.), the PUSCH resource can be mapped such that the configuration value included in the uplink grant for initial transmission or transmission before retransmission is equally applied to the PUSCH transmission not based on the related following uplink grant or the last SC-FDMA symbol is not used with respect to all PUSCH transmission not based on the uplink grant.

At this time, the PUSCH resource can be mapped such that a configuration value included in an uplink grant for the initial transmission or transmission before retransmission is equally applied to the PUSCH transmission not based on the related following uplink grant or the last SC-FDMA symbol is not used for all PUSCH transmission not on the basis of the uplink grant.

When information notifying whether the transmission/reception point different from the first transmission/reception point to which the UE belongs is configured as a reception point or information used for configuring the second transmission/reception point different from the first transmission/reception point is configured as a reception point is indirectly used as PUSCH mapping information, a PUSCH resource mapping rule for the PUSCH transmission can be newly redefined. For example, the PUSCH resource can be mapped to REs allocated for a DM-RS with respect to a RB(s) allocated for the corresponding PUSCH transmission and remaining REs except for REs corresponding to the last SC-FDMA symbol in the frequency priority scheme.

In other words, the controller 820 follows the existing PUSCH resource mapping rule when a transmission point and a reception point is equally configured as a transmission/reception point. The controller 820 can map the PUSCH resource to remaining REs except for REs allocated for a DM-RS with respect to a RB(s) allocated for the corresponding PUSCH transmission and REs corresponding to the last SC-FDMA symbol according to a new PUSCH resource mapping rule in the frequency priority scheme when the transmission point and the reception point are differently configured as transmission/reception points.

When receiving the information notifying whether the transmission/reception pint different from the first transmission/reception point to which the UE belongs is configured as a reception point or the information (e.g., a virtual cell identity) used for configuring the second transmission/reception point different from the first transmission/reception point as a reception point, the controller 820 can map the PUSCH resource to the remaining REs except for REs allocated for a DM-RS with respect to a RB(s) allocated for the corresponding PUSCH transmission and REs corresponding to the last SC-FDMA symbol in the frequency priority scheme according to a new PUSCH resource mapping rule instead of a PUSCH resource mapping rule applied on the basis of the cell-specific SRS sub-frame/bandwidth configuration information included in the cell-specific SRS parameter received through the SIB2 of the first transmission/reception point.

When the types of the C-RNTI used for calculating the CRC attached to the DCI indicating the uplink grant for the PUSCH resource allocation of the corresponding UE (the types of C-RNTI used for generating the CRC) is used as the PUSCH mapping information indicating whether the PUSCH resource is mapped to the last SC-FDMA symbol, the controller is allocated with the additional second C-RNTI different from the first C-RNTI and the controller performs blind decoding with respect to a DCI format corresponding to an uplink grant (e.g., a DCI format 0 or 4) on the basis of the first C-RNTI as well as performs additional blind decoding on the basis of the newly-allocated second C-RNTI when performing blind decoding for a UE-specific search space or a common search space of the PDCCH. At this time, when receiving the DCI using the first C-RNTI, the corresponding UE applies the PUSCH resource mapping for the allocated PUSCH transmission using up to the last symbol of the SC-FDMA, and when receiving the DCI using the second C-RNTI, the corresponding UE applies the PUSCH resource mapping for the PUSCH transmission with respect to remaining symbols except for the last symbol of the SC-FDMA.

In this case, the PUSCH resource can be mapped such that a configuration value included in an uplink grant for the initial transmission or transmission before retransmission is equally applied to the PUSCH transmission not based on the related following uplink grant or the last SC-FDMA symbol is not used for PUSCH transmission not on the basis of the all uplink grant.

Meanwhile, in order to reduce a load of the decoding, the number of performing blind decoding on the basis of the corresponding second C-RNTI with respect to each AL may be limited or a search space (e.g., only a common search space or only a UE-specific search space) for blind decoding based on the second C-RNTI may be limited.

The transmission unit 830 performs uplink transmission including a PUSCH mapped to a RB to a second transmission/reception point serving as a reception point by the controller.

The contents related to the standard mentioned in the above embodiments are omitted for simplifying the description of the specification, and configure a part of the present specification. Thus, adding a part of the contents relating to the standard to the present specification or describing the part of the contents in claims are interpreted to correspond to the scope of the present disclosure.

In detail, the accompanying following documents, which are a part of the previously published documents, configures a part of the present specification. Thus, adding a part of the contents relating to the standard contents and the standard documents or describing the part of the contents in claims is interpreted to correspond to the scope of the present disclosure.

Although the embodiments of the present disclosure have been described for illustrative purposes, those skilled in the art will appreciate that various modifications, additions and substitutions are possible, without departing from the scope and spirit of the invention. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

The invention claimed is:

1. A method of transmitting channel mapping information by a transmission/reception point, the method comprising:
   generating physical uplink data channel mapping information of a transmission/reception point different from a serving transmission/reception point of a first user equipment (UE), wherein the first UE belongs to the serving transmission/reception point; and
   transmitting the physical uplink data channel mapping information to the first UE such that the first UE performs a physical uplink data channel transmission using the physical uplink data channel mapping information,
   wherein the physical uplink data channel transmission includes:
   when the physical uplink data channel transmission is not a grant-based uplink transmission,
   performing a resource mapping such that a physical uplink data channel resource is mapped to a last SC-FDMA symbol of a sub-frame indicated by a previous uplink grant applied to initial transmission, transmission before retransmission for the initial transmission, or transmission before the retransmission.

2. The method of claim 1, wherein:
   the physical uplink data channel mapping information is a cell-specific Sounding Reference Signal (SRS) parameter of the transmission/reception point including SRS sub-frame configuration information and SRS bandwidth configuration information; and
   in the transmitting, the cell-specific SRS parameter of the transmission/reception point is transmitted to the first UE through UE-specific higher layer signaling.

3. The method of claim 1, wherein:
   the physical uplink data channel mapping information is information indicating whether a physical uplink data channel resource is mapped to a last Single-Carrier Frequency-Division Multiple Access (SC-FDMA) symbol of an uplink resource block; and in the transmitting, the information indicating whether the physical uplink data channel resource is mapped is transmitted through a physical downlink control channel while being included in a Downlink Control Information (DCI) format corresponding to an uplink grant of the transmission/reception point.

4. The method of claim 1, wherein:
the physical uplink data channel mapping information is one of first information notifying whether the uplink cooperative communication is performed and second information configuring the transmission/reception point as a reception point; and
in the transmitting, the first information and the second information are transmitted through one of higher layer signaling and a physical downlink control channel.

5. The method of claim 4, wherein the second information configuring the transmission/reception point as a reception point is a virtual cell identity.

6. The method of claim 1, wherein:
the physical uplink data channel mapping information is a type of Cell Radio-Network Temporary Identifiers (C-RNTIs) used for calculating a Cyclic Redundancy Check (CRC) attached to the DCI corresponding to an uplink grant; and
in the transmitting, a DCI format corresponding to the uplink grant calculated by one of the C-RNTIs is transmitted through a physical downlink control channel.

7. The method of claim 6, wherein the DCI format corresponding to the uplink grant is a DCI format 4 having a size different from that of other DCI formats.

8. A method of transmitting an uplink data channel by a user equipment (UE), the method comprising:
receiving physical uplink data channel mapping information of a target transmission/reception point from a serving transmission/reception point of the UE, wherein the target transmission/reception point is different from the serving transmission/reception point and the UE belongs to the serving transmission/reception point;
mapping a physical uplink data channel to a wireless resource according to the physical uplink data channel mapping information; and
transmitting the physical uplink data channel mapped to the wireless resource to the target transmission/reception point,
wherein in the mapping, when transmission of the physical uplink data channel is not a grant-based uplink transmission, a physical uplink data channel resource is mapped to a last SC-FDMA symbol of a sub-frame indicated by a previous uplink grant applied to initial transmission, transmission before retransmission for the initial transmission, or transmission before the retransmission.

9. The method of claim 8, wherein:
the physical uplink data channel mapping information is a cell-specific SRS parameter of the target transmission/reception point including SRS sub-frame configuration information and SRS bandwidth configuration information;
in the receiving, the cell-specific SRS parameter of the target transmission/reception point is received from the serving transmission/reception point through UE-specific higher layer signaling; and in the mapping, the physical uplink data channel is mapped to the wireless resource on the basis of the cell-specific SRS sub-frame/bandwidth configuration information included in the cell-specific SRS parameter of the target transmission/reception point by applying a physical uplink data channel resource mapping rule.

10. The method of claim 8, wherein:
the physical uplink data channel mapping information is information indicating whether a physical uplink data channel resource is mapped to a last SC-FDMA symbol of an uplink resource block;
in the receiving, the information indicating whether the physical uplink data channel resource is mapped is received from the serving transmission/reception point through a physical downlink control channel while being included in a DCI format corresponding to an uplink grant of the target transmission/reception point; and
in the mapping, the physical uplink data channel resource is mapped to the last SC-FDMA symbol of a sub-frame indicated by the uplink grant according to a configuration value of the information indicating whether the physical uplink data channel resource included in the DCI format corresponding to the uplink grant is mapped.

11. The method of claim 8, wherein:
the physical uplink data channel mapping information is one of first information notifying whether the uplink cooperative communication is performed and second information configuring the target transmission/reception point as a reception point;
in the receiving, the first information and the second information are received from the serving transmission/reception point through one of higher layer signaling and a physical downlink control channel; and
in the mapping, the physical uplink data channel resource is mapped to remaining resources except for a last SC-FDMA symbol of all sub-frames.

12. The method of claim 8, wherein:
the physical uplink data channel mapping information is types of C-RNTIs used for calculating a CRC attached to DCI corresponding to an uplink grant;
in the receiving, a DCI format corresponding to the uplink grant calculated by one of the C-RNTIs is received from the serving transmission/reception point through a physical downlink control channel; and
in the mapping, the physical uplink data channel resource is mapped to a last SC-FDMA symbol of a sub-frame indicated by the uplink grant.

13. The method of claim 12, wherein the DCI format corresponding to the uplink grant is a DCI format 4 having a size different from that of other DCI formats.

14. A user equipment (UE) for transmitting an uplink data channel, the UE comprising:
a reception unit configured to receive physical uplink data channel mapping information of a target transmission/reception point from a serving transmission/reception point of the UE, wherein the target transmission/reception point is different from the serving transmission/reception point to which the UE itself belongs;
a controller configured to map a physical uplink data channel to a wireless resource according to the physical uplink data channel mapping information; and
a transmission unit configured to transmit the physical uplink data channel mapped to the wireless resource to the target transmission/reception point wherein the controller is configured to:
when transmission of the physical uplink data channel is not a grant-based uplink transmission,
perform a resource mapping such that a physical uplink data channel resource is mapped to a last SC-FDMA symbol of a sub-frame indicated by a previous uplink grant applied to initial transmission, transmission before retransmission for the initial transmission, or transmission before the retransmission.

* * * * *